(12) United States Patent
Callsen et al.

(10) Patent No.: US 6,205,491 B1
(45) Date of Patent: Mar. 20, 2001

(54) METHOD AND APPARATUS FOR DEFERRED THROWING OF EXCEPTIONS IN C++

(75) Inventors: Christian J. Callsen, Redwood City; Ken M. Cavanaugh, Montara, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 08/993,075

(22) Filed: Dec. 18, 1997

(51) Int. Cl.[7] .............................. G06F 9/00; G06F 9/46; G06F 15/163
(52) U.S. Cl. .............................. 709/315; 712/244
(58) Field of Search .............................. 395/185.1, 591; 709/303, 310–332

(56) References Cited

U.S. PATENT DOCUMENTS

| | | |
|---|---|---|
| 4,823,310 | 4/1989 | Grand . |
| 5,263,160 | 11/1993 | Porter, Jr. et al. . |
| 5,455,951 | 10/1995 | Bolton et al. . |
| 5,475,845 | 12/1995 | Orton et al. . |
| 5,577,251 | * 11/1996 | Hamilton et al. ............ 709/101 |
| 5,628,016 | * 5/1997 | Kukol . |
| 5,692,169 | * 11/1997 | Kathail et al. ............ 712/244 |
| 5,724,503 | * 3/1998 | Kleinman et al. ............ 714/57 |
| 5,809,507 | * 9/1998 | Cavanaugh, III ............ 707/103 |

OTHER PUBLICATIONS

Java Remote Invocation Specification, Feb. 1997.*
Daniel Berg, Java Threads: A whitepaper; Mar. 1996.*
Muller, Ten Rules for Handling Exception Handling Successfully; C++ Report pp. 23–37; Jan. 1996.*
Jack Reeves, Exceptions and Standard C++; (B)leading Edge, pp. 56–64; May 1996.*
Corba 2.0 Specification, 1995.*
Bull et al., Life Cycle and Association Services Specification, Feb. 19,1993, Joint Object Services Submission.
Chin et al., Distributed Object–Based Programming Systems, Mar. 1991, vol. 23, No.1.
Silicon Graphics, Iterators, 1996, http:www.rt.e–technik.tu-darmastadt.de/~mali–dOC/STL_doc/iterators.html, pp 1–3.
IONA Technologies, Ltd., Orbix, Oct. 29, 1996, Dublin, Ireland.

* cited by examiner

Primary Examiner—Majid Banankhah
Assistant Examiner—P. G. Caldwell
(74) Attorney, Agent, or Firm—Beyer Weaver & Thomas, LLP (57) ABSTRACT

Methods and apparatuses for deferring, or delaying, the throwing of exceptions are disclosed. In one aspect of the present invention, an exception is raised during an invocation of a first object within an object-based system. The exception may be processed by catching the exception and making a first copy of the exception. Making the first copy of the exception includes storing the first copy of the exception in a dynamic memory. The first copy of the exception may then be processed by creating a runtime copy of the exception that is stored on an execution heap. The runtime copy of the exception may is then caught. The first copy of the exception is deleted from the dynamic memory, and the caught runtime copy of the exception is reprocessed. In one embodiment, processing the first copy of the exception includes throwing the first copy of the exception as a system exception. In such an embodiment, throwing the first copy of the exception as a system exception causes the runtime copy of the exception to be created.

14 Claims, 8 Drawing Sheets

```
                              ┌─250
      ┌ try {
 252 ─┤
      │                ┌─254
      └ } catch( ){              ┐
                                 │
                 ec = copy(e);   ├─256
                       ╲258      │
             }                   ┘ throw_and_delete(ec);
                              ╲260
```

*Figure 3a*

```
                                        ┌─280
                            ┌─282
       void throw_and_delete(CORBA_Exception *exc) {
 284─▶
      ┌ try {
      │
      │    if (is_system_exception(exc)) {
      │
 286 ─┤       throw * (CORBA_SystemException*)exc;
      │
      │    } else {
      │
      │       CORBA_UserException *ue = (CORBA_UserException*)exc;
      │
      │       ue -> raise();
      │                  ┌─290
      │    } catch(...) {           ┐
      │                             │
      │       delete exc;           │
      │                             │
      │       throw;                │
      │                             │
      │    }                        ┘
      └
       }
```

METHOD AND APPARATUS FOR DEFERRED THROWING OF EXCEPTIONS IN C++

CROSS REFERENCE TO RELATED APPLICATIONS

The following U.S. patent applications are related to the present application and are incorporated by reference herein in their entirety: U.S. patent application No. 08/993,800, entitled "Method and Apparatus for Fast, Local CORBA Object References"; U.S. Pat. No. 6,016,489, entitled "Method and Apparatus for Constructing Stable Iterators in a Shared Data Collection"; U.S. patent application Ser. No. 08/993,263, entitled "Marshaling and Unmarshaling Framework for Supporting Filters in a Distributed Object System"; U.S. patent application Ser. No. 08/993,206, entitled "Method and Apparatus for Enforcing Locking Invariants in Multi-Threaded Systems"; U.S. patent application No. 08/993,204, entitled "Method and Apparatus for Efficient Representation of Variable Length Identifiers in a Distributed Object System"; and U.S. patent application No. 08/993,287, entitled "Filter Framework for Executing Code During Method Invocation"; all filed on even date, and U.S. patent application No. 08/554,794, filed Nov. 7, 1995 as a continuation to Application No. 07/995,863, filed Nov. 21, 1992 (now abandoned); U.S. patent application No. 08/670,682, filed Jun. 26, 1996, U.S. patent application No. 08/673,181, filed Jun. 26, 1996; U.S. patent application No. 08/670,700 filed Jun. 26, 1996; U.S. patent application No. 08/670,681, filed May 26, 1996; U.S. patent application No. 08/670,684, filed May 26, 1996; and U.S. patent application No. 08/669,782, filed Jun. 26, 1996.

BACKGROUND OF THE INVENTION

1. Field of Invention

The present invention relates generally to object-based systems. More particularly, the present invention relates to methods and apparatuses for deferring the throwing of exceptions in an object-based system.

2. Description of the Relevant Art

In distributed object systems, client objects may invoke server objects. A client is typically an entity that requests that an operation be performed on an object, e.g., a server object or servant. Requests are often passed from a client to a servant through an object request broker (ORB) implementation, as defined under the Common Object Request Broker Architecture (CORBA) specification from the OMG, Revision 2.0, dated July 1995, and updated July 1996, which is incorporated herein by reference in its entirety.

Within the CORBA specification, an object model, ie., a CORBA object model, is defined over a programming language in which objects, or servants, which are implemented by servers, have references which may be exported to clients. The programming language over which the object model is defined may include, but is not limited to being, a programming language such as C++ or Java™, which was developed by Sun Microsystems, Inc. of Palo Alto, Calif. As will be appreciated by those skilled in the art, a particular program may serve as both a client and a server.

The CORBA object model defines an Interface Definition Language (IDL) which enables interfaces to be defined for object references that are associated with servants. Once proper interfaces are defined for object references, an IDL compiler is then typically used to translate IDL definitions of the interfaces into programming language definitions. By way of example, in the C++ programming language, the programming language definition can be a C++ class. Alternatively, in a Java™ environment, the programming language definition can be a Java™ interface.

After a programming language definition is generated by the IDL compiler, the programming language definition can be used to implement the servant associated with the programming language definition. The programming language definition may also be used to connect the servant with an appropriate object request broker (ORB) implementation, as will be appreciated by those skilled in the art.

The CORBA object model generally supports non-local invocations on servants. A client from a process different than the servant, which is in a server process, may invoke on an object reference associated with the servant. The client ORB implementation typically marshals, e.g., "packs," an invocation request and dispatches, or otherwise transfers, the invocation request to the server process. In general, an interprocess communication primitive, which complies with a protocol defined by the client and the server, is used to transfer invocation requests between the client and the server.

Once a server process receives an invocation request from the client process, the server process unmarshals, e.g., "unpacks," the invocation request, and identifies the servant within the server process which is suitable for servicing the invocation request. When the appropriate servant is located, the invocation is forwarded from the client process to the servant. As will be appreciated by those skilled in the art, the invocation request is generally forwarded with parameters which are specified by the client.

An invocation is performed on the servant in response to the invocation request from the client. After the invocation on the servant is completed, the server ORB implementation typically accumulates any results, e.g., output values, generated by the invocation, and transfers the results back to the client. The server process marshals the results for transport to the client, which, when the results are received, unmarshals the results.

Within an object-based system such as a distributed object system, exceptions may arise when objects are invoked. Exceptions can generally arise for a variety of different reasons. By way of example, exceptions often indicate that an exceptional condition, or an error, has occurred. Exceptions are typically raised either by the servant that is "servicing," or otherwise fulfilling, the request of a client, or by an ORB implementation. When an exception is raised, the exception is passed back to the client. In general, passing, or throwing, an exception, to a client serves the purpose of informing the client that an exceptional condition or error has occurred.

In some environments, such as a C++ environment, an exception is typically an exception object that resides on a call-stack for holding exceptions. The lifetime of such an exception object is generally limited by the programming language scoping of the exception handing clause in an associated skeleton structure, as will be appreciated by those skilled in the art. A skeleton, which is generated by an IDL compiler, serves as a link between an ORB implementation and a servant which is performing invocations or, more specifically, non-local invocations. While a skeleton may generally perform a variety of different tasks, the skeleton is often responsible for informing an ORB about the parameters associated with an invocation, and for invoking the servant for an object reference.

Within a C++ environment, an exception object must often exist beyond the scope of an exception handling object. Many exceptions are temporarily stored and thrown later at an appropriate time. An exception is often not immediately thrown when it arises. Rather, an exception raised by a servant, for example, may be stored and thrown to a client at a later time, as for example after "mandatory" code is executed. To delay the throwing of an exception, a copy of the exception is generally made. The C++ run-time environment allocates a copy of the exception, e.g., a dynamic copy, which is stored and eventually thrown when appropriate. In order to throw the exception, the type of exception that is being thrown must generally be known.

Code associated with making a copy of an exception, keeping track of the exception in terms of what type of exception it is, and enabling the copied exception to be thrown, is often significant. By way of example, such code often includes sections which are essentially duplicates from other sections. Hence, the overall process of throwing exceptions may be inefficient, as duplicate code must often be processed, and exception types must often be tracked. By way of example, inlining duplicate code may lead to excessive code bloat.

In addition, when copies of exceptions are made, if the copies are not released, the copies may cause memory leakage to occur. As will be appreciated by those skilled in the art, memory leakage generally occurs when memory is dynamically allocated, but is not being freed. To prevent memory leakage, memory may be periodically released. However, when memory is periodically released, a copy of an exception may be released before it has been used, i.e., thrown. Therefore, what is desired is an efficient method and apparatus for throwing exceptions in an object-based system.

SUMMARY OF THE INVENTION

To achieve the foregoing and other objects and in accordance with the purpose of the present invention, methods and apparatuses for deferring, or delaying, the throwing of exceptions are disclosed. In one aspect of the present invention, an exception is raised during an invocation of a first object within an object-based system. The exception may be processed by catching the exception and making a first copy of the exception. Making the first copy of the exception includes storing the first copy of the exception in a dynamic memory. The first copy of the exception may then be processed by creating a runtime copy of the exception that is stored on an execution heap. The runtime copy of the exception may is then caught. The first copy of the exception is deleted from the dynamic memory, and the caught runtime copy of the exception is reprocessed.

In one embodiment, processing the first copy of the exception includes throwing the first copy of the exception as a system exception. In such an embodiment, throwing the first copy of the exception as a system exception causes the runtime copy of the exception to be created. In another embodiment, processing the first copy of the exception involves throwing the first copy of the exception as a user-defined exception. In such an embodiment, throwing the first copy of the exception as a user-defined exception causes the runtime copy of the exception to be created.

According to another aspect of the present invention, a method for processing a request dispatched to a skeleton in a skeleton layer on a server of a distributed client/server based computing system includes constructing a custom object associated with the request. The custom object is generally a module of application code which is inserted into the distributed client/server based computing system. The method also includes calling a custom pre-dispatch method to determine an appropriate servant to use to invoke a called method specified in the request, and selecting an unmarshaling mechanism which corresponds to the request. Once selected, the unmarshaling mechanism is used to unmarshal at least a part of the marshal buffer into invocation arguments. The called method is then invoked in the servant which corresponds to the request, and a determination is made regarding whether an exception is raised during invocation of the called method. A custom post-dispatch method which corresponds to the custom object is also called. The custom post-dispatch method is used to process the exception when it is determined that the exception was raised during invocation of the called method. In one embodiment, when it is determined that an exception is raised during invocation of the called method, the method further includes creating a first copy of the raised exception.

BRIEF DESCRIPTION OF THE DRAWINGS

The invention, together with further advantages thereof, may best be understood by reference to the following description taken in conjunction with the accompanying drawings.

DETAILED DESCRIPTION OF THE EMBODIMENTS

Figure 1A:
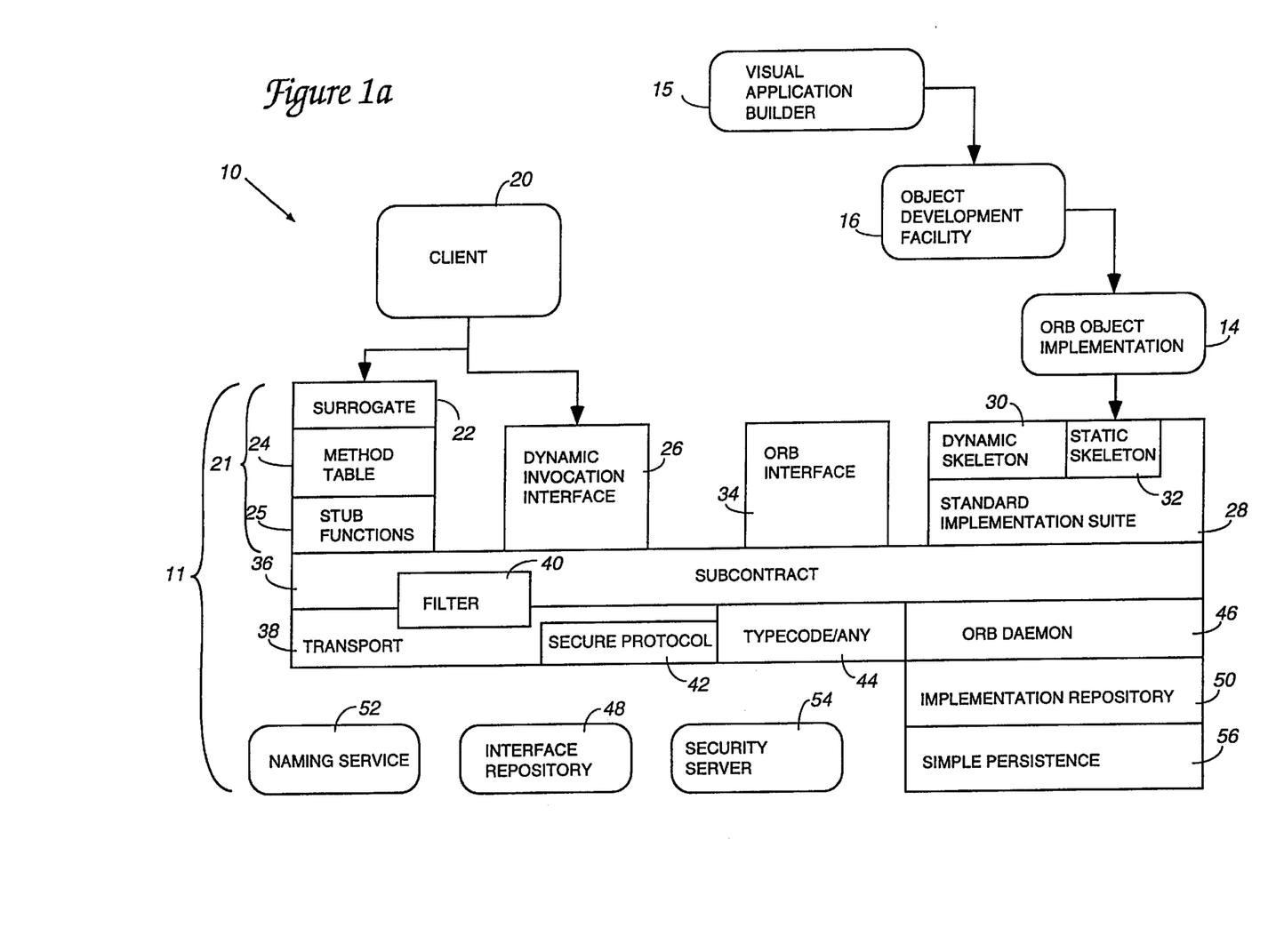
FIG. 1a is a symbolic overview of a distributed object system.
Figure 1B:
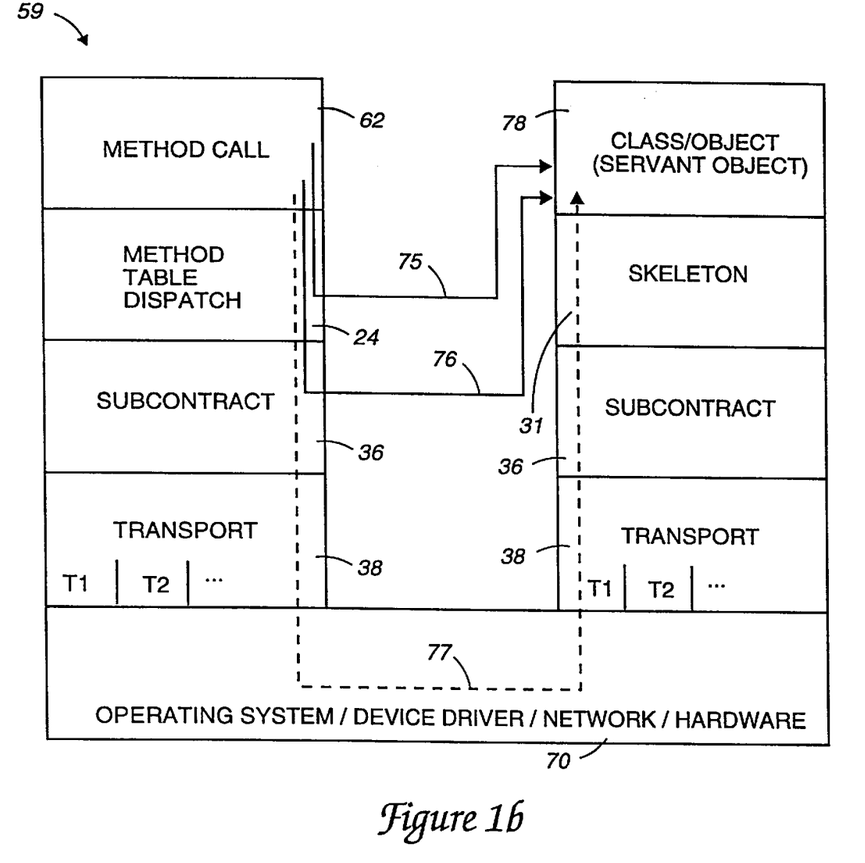
FIG. 1b is a diagrammatic illustration which represents how a request by a client is routed through the architecture of a client side and a server side of a distributed object system, and the interface between the client side and the server side of the distributed object system.
Figure 1C:
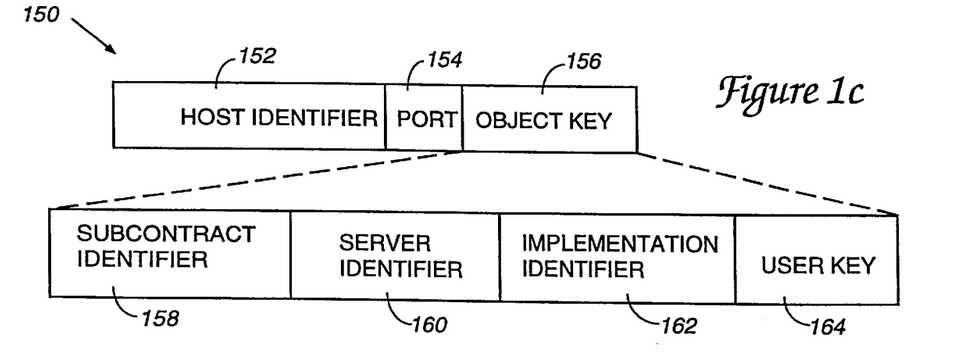
FIG. 1c is a diagrammatic representation of an object reference.

The present invention is directed toward distributed object systems and will be described with reference to several preferred embodiments as illustrated in the accompanying drawings. The invention may be practiced within the context of any suitable distributed object system, including those defined under CORBA or any other suitable specification. However, for purposes of illustration, the present invention will be described primarily within the context of an Object Request Broker (ORB) implemented under the CORBA specification from the OMG, Revision 2.0, dated July 1995, which is incorporated herein by reference. FIG. 1a diagrammatically illustrates the overall architecture of a representative distributed object system suitable for implementing the present invention. FIG. 1b diagrammatically illustrates some possible flow paths that a request from a client to a servant object may follow within such an architecture that includes a three level dispatch mechanism. FIG. 1c shows one object reference data structure that may be used by a client to refer to a servant object.

A distributed object system 10 typically includes an Object Request Broker (ORB) 11 as is symbolically illustrated in FIG. 1a. ORB 12 provides all of the location and transport mechanisms and facilities necessary to deliver a call from a client to a servant (target object) and to return a response to the client, as will be discussed below with reference to FIG. 1b. The client and servant may be located in the same process, in different processes on the same machine, or on completely different machines. For the purposes of this discussion, client 20 may be any code that invokes an operation on a distributed object and thus may or may not take the form of distributed object or a process. Normal object implementation 14 is a representation of an object type defined in a traditional object programming language, such as C++. A wide variety of representations are possible. By way of example, an object implementation 14 may be a simple C++ object type that has been provided by an application developer. Alternatively, an implementation for an object type may be developed within a visual application builder 15. This visual application builder allows a developer to visually select existing object types from a catalog and graphically connect the services provided by one object to the services needed by another (attributes, arguments, etc.) in order to create a new implementation for an object type.

An object development facility 16 may be used to simplify the creation and the installation of distributed objects. It is used to "wrap" or encapsulate developer objects in distributed object code. As such, object development facility 16 may be used to transform a developer object into an ORB object implementation 14. In this example, ORB object implementation 14 is presented as a server as shown by its location in the diagram. A developer uses an interface definition language to define an interface for an ORB object, provides a developer object implementation that implements that object's behavior, and then uses the object development facility in order to produce an ORB object implementation 14. At run time, an instance of this ORB object, e.g., a servant object, is created that will utilize this ORB object implementation 14. It should be appreciated that the object development facility may also be used to create objects that take the role of clients at some point.

Client 20 communicates with a servant by way of a stub 21, a method table dispatch 24, a subcontract layer 36, possibly a filter 40, and a transport layer 38. Stub 21 includes a surrogate 22, a method table 24, and a stub function 25. Client 20 communicates initially with surrogate 22 which appears to the client as the server object. Alternatively, client 20 may communicate directly with the server object through a dynamic invocation interface (DII) 26 instead of through surrogate 22, method table 24, and stub function 25. Dynamic invocation interface 26 is used to enable clients, as for example client 20, to construct dynamic requests. One procedure by which a client makes a call to a servant utilizing the above layers is described in more detail below with reference to FIG. 1b.

Subcontract layer 36 provides the functionality required by an object in order to utilize subcontracts to implement various services (or features or object mechanisms) named by a particular subcontract, as described in greater detail in above-referenced U.S. patent application Ser. No. 08/554,794, filed Nov. 7, 1995. A subcontract identifies a quality of service provided by the distributed object system that may be utilized by an individual object. For example, a subcontract may identify that the feature of security is to be used for a particular object. A technique by which a particular subcontract may be associated dynamically at run time with a servant object is described in above-referenced U.S. patent application Ser. No. 08/670,682, filed Jun. 26, 1996, which is incorporated herein by reference. Filter 40, if being used, may perform a variety of tasks, such as compression, encryption, tracing, or debugging, which are to be applied to communications to and from an object.

Transport layer 38 operates to marshal, unmarshal and physically transport information to and from a servant that typically does not share the same process as a client. A technique for marshaling/unmarshaling an object reference is described in above-referenced U.S. patent application Ser. No. 08/670,681, filed Jun. 26, 1996, which is incorporated herein by reference. Mechanisms for marshaling and unmarshaling are described in above-referenced U.S. patent application Ser. No. 08/673,181 (Atty: Docket No. SUN1P082), filed Jun. 26, 1996, which is incorporated herein by reference.

A standard implementation suite 28 (or object adapter) represents a set of subcontracts that interact with ORB object implementations 14 in identical ways, as for example object key management. One such implementation suite is described in above-referenced U.S. patent application Ser. No. 08/669,782, filed Jun. 26, 1996, which is incorporated herein by reference. It should be duly noted that a subcontract may belong to multiple implementation suites. Hence, other implementation suites that utilize different subcontracts are possible. A skeleton, which may take the form of either static skeleton 32 or dynamic skeleton 30 is used to transform requests into a format required by an ORB object implementation 14, e.g., a servant object. Thus, skeletons 32, 30 call an appropriate ORB object implementation 14. Static skeleton 32 is used to call interface-specific object implementations 14, while dynamic skeleton 30 is used generically when interface-specific objects are not available. An ORB interface 34 is the interface that goes directly to the ORB that is the same for all ORBs and does not depend upon an object's interface or object adapter. An ORB Daemon 46 is responsible for ensuring that object servers are active when invoked by clients. A technique for starting object servers is disclosed in U.S. patent application Ser. No. 08/408,645 which is hereby incorporated by reference.

Secure Protocol 42 is a secure interoperability protocol that secures the internet inter-ORB protocol and helps to transmit information through transport layer 38 in a secure fashion. This may mean integrity protection, confidentiality, etc. The internet inter-ORB protocol is a protocol that typically communicates between processes on different machines. However, in some cases, the internet inter-ORB protocol may communicate between process on the same machine. The security server 54 is a security administration server that secures the services that are used between processes on different computers.

Typecode/Any module 44 implements typecode and "Any" objects. Typecode describes an Interface Definition Language (IDL) data type, allowing type descriptions to be transmitted between clients and servers. An instance of an IDL data type may be encapsulated by an "Any" object. An Any object refers to typecode of the encapsulated data, and a generic encoding of the data.

An implementation repository 50 is used to store information relating to object servers. Specifically, implementation repository 50 stores the information needed to start a server process. For example, implementation repository 50 stores information such as the location of the server program, any arguments to the program, and any environment variables to pass to the program, etc.

Simple persistence 56 uses an Interface Definition Language (IDL)-defined type and the output from running that IDL type through the IDL compiler, together with a portion of additional code so that an IDL-defined type can be read from, and written to, disk. A name server 52 is used to name ORB objects. A client, as for example client 20, may use name server 52 to find a desired object by name. Name server 52 returns an object reference, which in turn may be used to send requests to that object. An Interface Repository 48 (IFR) knows about all interfaces for all objects within the distributed object system.

A request made by a client using a method table ("m-table") dispatch will pass through a variety of the aforementioned layers of the architecture on its way to the servant as diagrammatically illustrated in FIG. 1b. The request is initiated by a client and may take any suitable form. The form of the request will depend to a large extent upon the nature of the programming language used to create the client. By way of example, if the client is written in the C++ language, the request may take the form of a C++ method call 62. The call is made to a designated object reference taking the form of a surrogate. The surrogate includes methods that comply with the object's interface. As will be appreciated by those skilled in the art, the object reference used at different locations within a distributed object system may vary significantly in appearance. In the embodiment described, the client side object reference is a dual pointer (referred to herein as a "fat pointer"). A fat pointer contains two distinct pointers, or location indicators. A first pointer points to a client representation ("client rep") associated with the referenced object. A second pointer points to a method table of the method table dispatch 24 that is associated with the referenced object. It should be appreciated that as used herein, the term "pointer" is used to identify not only locations in computer or network memory, but also to refer to a location indicator in general. A client representation is an object that has methods which support invocation as well as CORBA defined "pseudo" object reference operations. These operations include, but are not limited to, a duplicate method, a release method, a narrow method, a hash method, and an is_equivalent method.

After the client has initiated a call, the call is processed using a method table dispatch mechanism 24. Such a technique is disclosed in U.S. patent application Ser. No. 08/307,929, and is hereby incorporated by reference. The method table dispatch mechanism uses a method table that contains a list of pointers to stub functions 25, one of which is associated with the method to be invoked. Stub functions 25 receive a function or procedure call in the "native" language of the client process, then use either a subcontract layer 36 or a native call to eventually call the corresponding servant object. The native language may be any suitable language, as for example a language such as C++.

Method table dispatch 24 determines the appropriate stub function 25 to process the method call, and then pairs the method call with the appropriate stub function 25. In the event that the client making the method call is in the same process as the servant object, a local stub function is called. The local stub function sends the method call directly to servant object 78. A technique for routing calls within a local process is described in above-referenced U.S. patent application Ser. No. 08/670,684, filed Jun. 26, 1996, which is incorporated herein by reference. Alternatively, if the servant object is in a different process, i.e., a remote process, a remote stub function is called. The remote stub function invokes the client representation, which delivers the invocation to servant object 78.

Subcontracts implemented by subcontract layer 36 are logic modules which provide control of the basic mechanisms of object invocation and argument passing that are important in distributed object systems. A subcontract implemented by subcontract layer 36 determines a specific quality of service for use by an object. A subcontract is uniquely identified by a subcontract identifier, which is typically embedded in an object reference. A quality of service is a set of service properties. Among possible service properties which are selectable are qualities relating to server activation, security, transactions, filterability, and clean shut-down. Subcontracts are configured such that certain qualities of service are available. With predetermined qualities of service, the overhead associated with processing individual service properties is reduced. Realistically, only "reasonable" or commonly used combinations of service properties are supported with subcontracts. However, subcontracts may be created to meet the specific requirements of a given distributed object system.

The identification of an appropriate subcontract in subcontract layer 36 may be thought of as the identification of a desired function that is unique to that subcontract. For example, a marshal function or an unmarshal function is defined for each subcontract. A subcontract marshal function is used by a stub to marshal an object reference so that it may be transmitted to another address space, or domain. The object reference is typically processed by a transport mechanism in transport layer 38.

A transport mechanism such as T1, T2, etc., which is a part of the transport layer 38, is used to marshal and physically transport information to and from servant objects. Information, i.e. the object reference or the request, is converted into protocols appropriate to a given domain. By way of example, protocols may include, but are not limited to, Ethernet protocols and internet interoperable protocols (IIOPs). In some uncommon cases, protocols may even entail the use of electronic mail to transmit instructions to be implemented on a server. After information is marshaled, the transport mechanism then transports information through any combination of an operating system, a device driver, or a network, that are all a part of hardware 70 used by the client side of a distributed object system. While transport mechanisms require a conversion of information into a protocol appropriate to a given domain, some transport mechanisms to do not require the encoding of information for different domains. One transport mechanism which does not require a conversion of information into a protocol appropriate to a domain other than the one on which information originates is termed a "door". Doors are essentially gateways between two different processes on the same host. The use of doors eliminates the need for a conversion of information into a canonical implementation in transport layer 38, as there is no need to encode information into a protocol which may be used by a different machine by virtue of the fact that information is remaining on the same host and therefore does not require a change of domain. Hence, information may simply be "flattened out," or marshaled into a stream which is not encoded for use by a different machine, and passed between the two processes on the host.

Once information is transported through hardware 70 used by the client side, the information is then transported to hardware 70 on the server side of a distributed object system. Once information is routed through hardware 70, the server side of a distributed object system invokes a transport mechanism such as T1, T2 etc. to receive information on an end point which is a part of transport layer 38. In the event that an end point is not created by transport layer 38, transport layer 38 provides the functionality needed for the end point to be created by subcontract layer 36. By way of example, a door end point is typically created by subcontract layer 36, while other end points, including network and TCP/IP end points, are typically created by transport layer 38. Regardless of whether end points are created by subcontract layer 36 or transport layer 38, end points "live in," ie., are a part of, transport layer 38. End points are essentially ports which receive information from a different domain. After an end point in transport layer 38 receives information transported from a different domain, the end point then dispatches the information from transport layer 38 to subcontract layer 36. Subcontract layer 36, or more specifically the subcontract in subcontract layer 36 which receives the information, then dispatches the information to the skeleton and the servant.

Subcontract layer 36 provides the functionality to unmarshal at least some of the information it has received. That is, subcontract layer 36 unmarshals at least part of the request. Then, the request is dispatched to a skeleton 31 which transforms the request into an implementation specific format required by servant object 78. The skeleton may either be a static skeleton or a dynamic skeleton as described above.

In general, a remote request must be routed through the client side and the server side as described above. The method call 62 is received, method table dispatch layer 24 is used to identify an appropriate subcontract prior to the selection of a transport mechanism in transport layer 38 which marshals the request and prepares it for transport to another domain. Through hardware 70, the marshaled request is transported to the server side where it is received on an end point which is a part of transport layer 38. An appropriate end point receives information transported across a wire, and information is dispatched from transport layer 38 to subcontract layer 36, which provides the functionality to at least partially unmarshal the information it has received. The subcontract then dispatches the request to skeleton 31 which transforms the request into a specific format required by servant object 78. This path is shown by arrow 77, and is the path which may be taken by both remote and local requests.

However, if a client and a server are in a local process, i.e., both the client and the server are in the same process, the use of the path shown by arrow 77 as described above is unnecessarily complex. If it is known that the client and the server are in the same process, it is possible to shorten the invocation, or flow, path of a request for service. If a local process may be identified when an object reference is created, shortened flow paths, i.e., the paths represented by arrows 75 and 76, may be taken to send a request from what is a client to a server which are on the same host. The path represented by arrow 76 is more likely to be taken, as it uses subcontract layer 36 to identify an appropriate subcontract. However, in situations in which an appropriate subcontract does not need to be explicitly identified, the path represented by arrow 75 may be taken.

FIG. 1c will now be used to describe an embodiment of an object reference. As will be familiar to those skilled in the art, object references may take a variety of forms depending upon the location within the process that they are being held at any given time. However, by way of background, a representative object reference for use in a system as described above with respect to FIG. 2a is illustrated in FIG. 2c. In the implementation shown therein, object reference 150 includes a host identifier 152, a port designation 154, and an object key 156. Object key 156 includes a subcontract identifier 158, a server identifier 160, an implementation identifier 162, and a user key 164. Host identifier 152 denotes a particular computer in a network, while port designation 154 identifies the port of the selected computer which is to be used for communication. Object key 156 provides further identifying information used in order to locate a desired servant object on its host machine.

Server identifier 160 names a particular process or program in which the servant object resides, while user key 164 is a unique number or string used to locate the servant within the process named by server identifier 160. Subcontract identifier 158 is used to attach the protocol of a particular subcontract and its associated services with a servant, and implementation identifier 162 names an implementation of an interface that is to be used with that servant object.

In general, a client in one process may invoke on an object reference which is associated with a different process, e.g., a server process. That is, non-local invocations are supported by distributed object system 10 of FIG. 2a, which was described above. When a server process receives an invocation from a client process, the server process unpacks the invocation, locates the appropriate servant, and forwards the invocation to the servant. The invocation is typically forwarded to the servant with parameters which were specified by the client. When the invocation on the servant is completed, then the ORB object implementation collects substantially any output values generated by the invocation, and forwards the output to the client.

A skeleton, such as static skeleton 32 of FIG. 1a, essentially serves as a link between an ORB object implementation and a servant for performing non-local invocations. A skeleton is typically generated by an IDL compiler with knowledge of the interface which is to be supported by the servant. While the tasks associated with a skeleton may be widely varied, the tasks associated with the skeleton generally include informing an ORB about parameters for an invocation, invoking the servant with the parameters, and catching, as well as storing, any exceptions which are raised during the invocation.

During an invocation, an exception may be raised when an error condition or an exceptional condition occurs. Exceptions are typically raised by the servant or by the ORB implementation associated with the invocation. In general, an exception may either be a system exception, which is of a fixed format, or a user exception, which is not of a fixed format. A system exception includes standard exceptions defined in within the CORBA specification, whereas user exceptions, or user-defined exceptions, are IDL generated exceptions which are specified by a user. In the described embodiment, "CORBA exceptions" include both system exceptions and user exceptions.

In the architecture described above with respect to FIG. 1a, the skeleton is used as a link between the ORB implementation and a servant for performing non-local invocations, as described above. Skeleton code, which is generated by an IDL compiler, for non-local invocations may generally be arranged to perform a variety of different tasks which include, but are not limited to, preparing for invocations by providing customization points, as will be described below with respect to FIGS. 4a and 4b. In the described embodiment, skeleton code is also arranged to catch and store raised exceptions, call post-invocation customization points, and to raise an exception such that the ORB may pack the exception for transport to a client. As will be appreciated by those skilled in the art, the exception that is packed is transported to the client whose invocation of a servant resulted in a raised exception.

Figure 2:
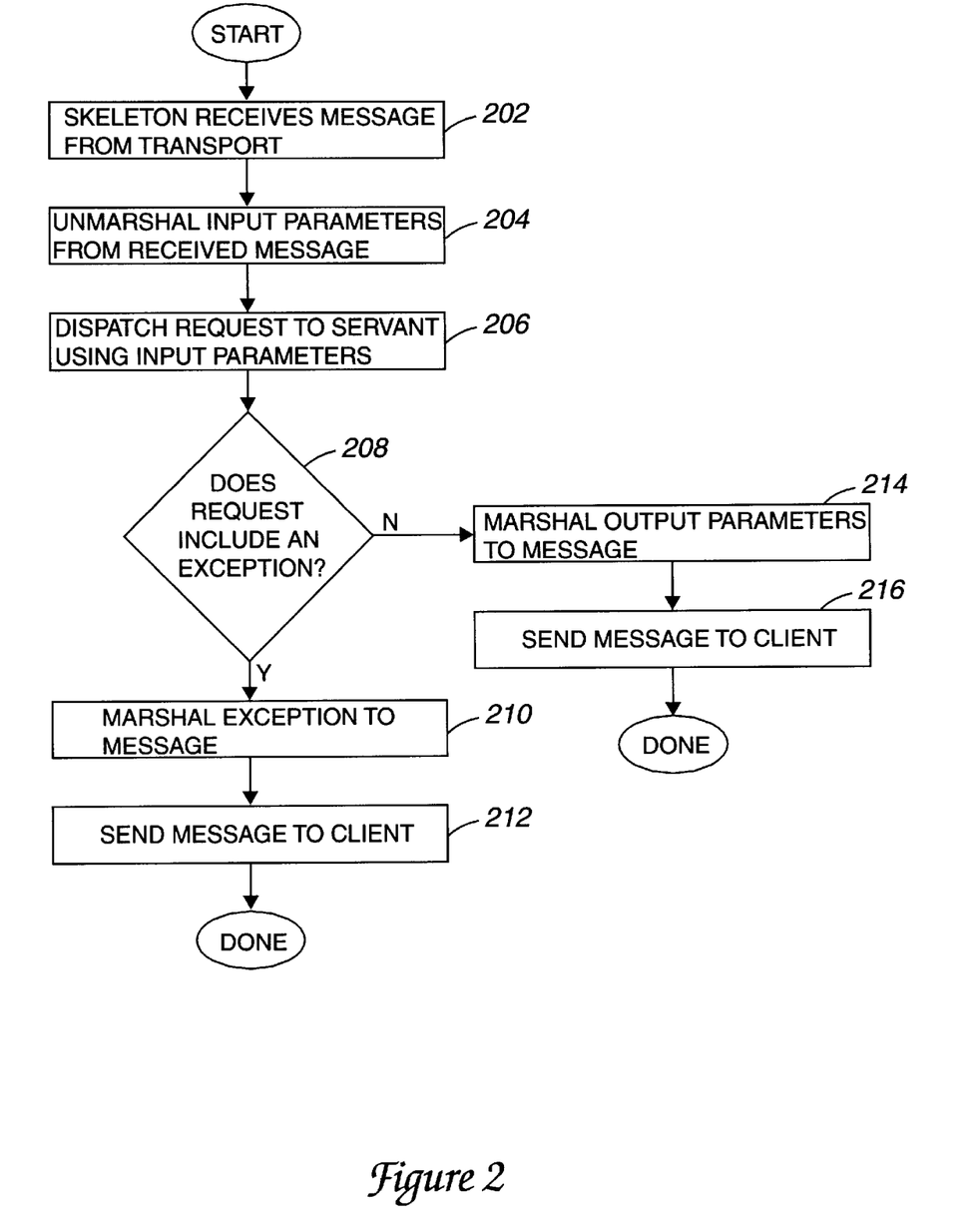
FIG. 2 is a process flow diagram which illustrates the steps associated with processing a request from a client.

In one embodiment, post-invocation customization points are always called, regardless of whether an exception has been raised. As such, any exception that is raised generally is stored temporarily until after the post-invocation customization points are called. Post-invocation customization points may be inserted multiple times within skeleton code such that the post-invocation customization points will be called whether an exception has been raised or not. However, since post-invocation hooks are inlined into code when the code is optimized, inlining multiple post-invocation customization points may lead to code bloat. While the insertion of post-invocation customization points in multiple locations may increase the speed at which the skeleton code executes, the increase in speed often does not compensate for the potential code bloat. With reference to FIG. 2, the steps associated with processing a request, e.g., an invocation request, from a client will be described. The process begins at step 202 where a skeleton receives a message from a transport. Once a message is received by the skeleton, the input parameters in the message are unmarshaled from the received message in step 204. Using the input parameters unmarshaled from the received message, a request is dispatched to a servant, or a target object, in step 206. As will be appreciated by those skilled in the art, the request is dispatched to a servant by the skeleton.

After the message is dispatched to the servant, a determination is made in step 208 regarding whether the request raises, or "includes," an exception. Specifically, a determination is made regarding whether the dispatch of the request to the servant resulted in an exception being raised. If it is determined that the request does not include an exception, then process flow moves from step 208 to step 214, where output parameters from the request are marshaled into a message. Once the output parameters are marshaled into a message, the message is sent to the client in step 216, and the processing of a request from a client is completed.

Alternatively, if the determination in step 208 is that the request did indeed raise an exception, then in step 210, the exception is marshaled into a message. The message is then sent to the client in step 212, and the steps processing of a request from a client is completed.

When an exception is raised during an invocation, or at substantially any other time, it may be desirable for the exception to be available outside of the exception handling clause in a skeleton. Some programming language environments, as for example a C++ environment, are arranged to make runtime copies of exception objects. However, creating and storing runtime copies of exception objects in an exception stack, or heap, is often inefficient, and may result in memory leakage if the exception is to remain available for delayed use.

Figure 3A:
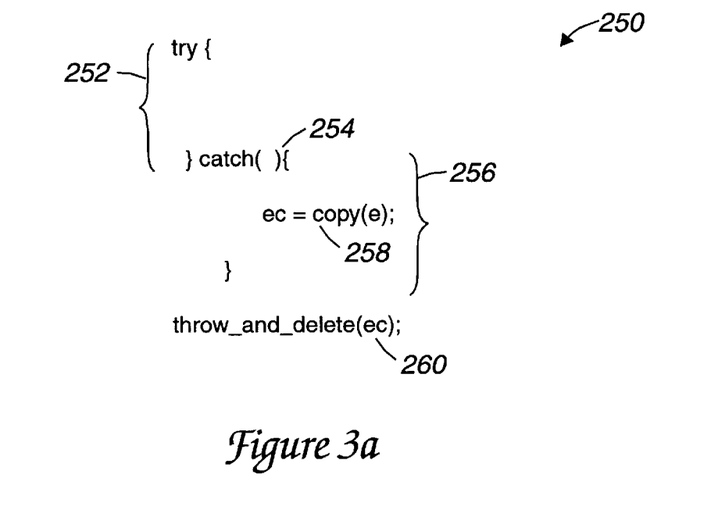
FIG. 3a is a diagrammatic representation of a code segment which calls an exception handling subroutine in accordance with an embodiment of the present invention.

A copy of an exception object may be made and stored, off of an exception heap, such that the exception object is accessible for later use. When the exception is to be re-thrown, the copy of the exception object may be deleted to avoid memory leakage. With reference to FIG. 3a, a process of making a copy of an exception object using a method that is specified in the CORBA specification will be described in accordance with an embodiment of the present invention. A try_catch phrase 250, which is defined in a C++ environment, includes a try block 252 and a catch block 256. Try block 252 generally includes code which performs actions that may cause an exception to be raised. A catch statement 254 is arranged to catch an exception associated with try_catch phrase 250. Within catch block 256, a copy statement 258 is arranged to copy the exception that was caught by catch statement 254.

After a copy of an exception is made using copy statement 258, the exception is typically processed within catch block 256. For instance, certain exceptions may be considered to be "acceptable," and could conceivably be ignored, while other exceptions may be used in the correction of statistics for debugging purposes. The copy of the exception that is made using copy statement 258 exists outside of catch block 256. In other words, the copy of the exception exists outside of the scope of try_catch phrase 250. Once the execution of catch block 256 is completed, a throw_and_delete routine 260 is executed to throw the copied exception and to delete the copied exception, as will be described in more detail below with reference to FIG. 3b.

Figure 3B:
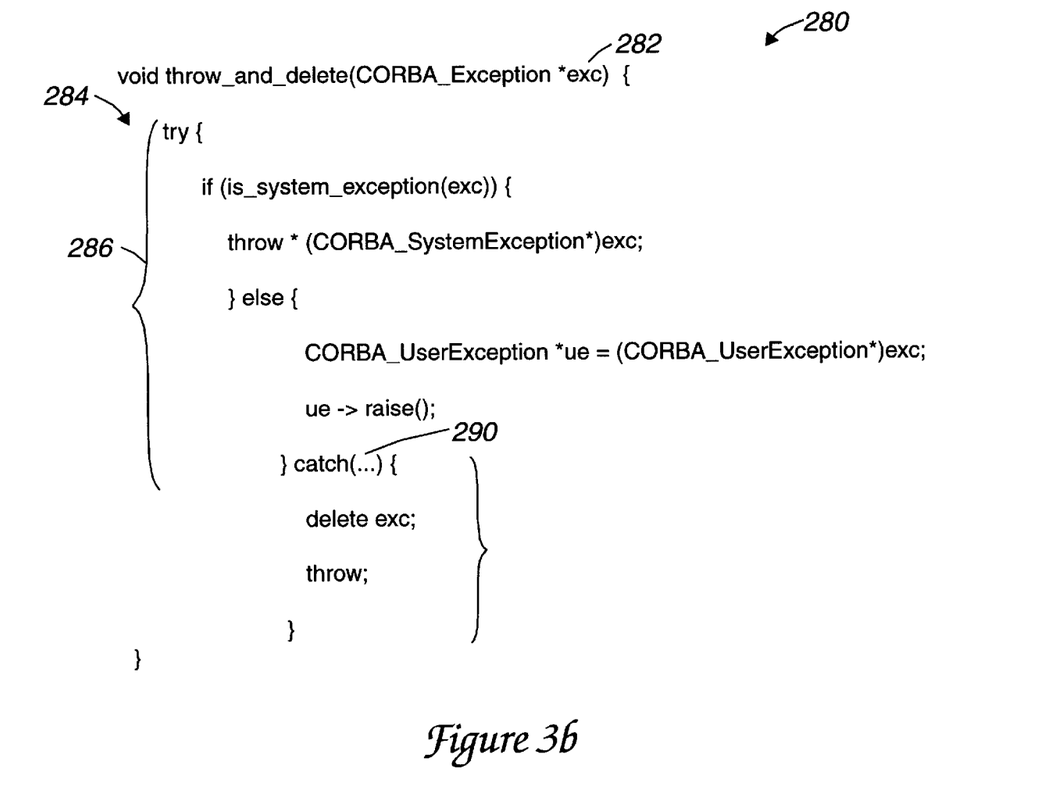
FIG. 3b is a diagrammatic representation of the exception handling subroutine of FIG. 3a in accordance with an embodiment of the present invention.

Throw_and_delete routine 260 is generally an exception handling subroutine that raises the copied exception created using copy statement 258, catches the copy of the exception that is made by the C++ runtime environment, deletes the copied exception created using copy statement 258, and rethrows the copy of the exception that is made by the C++ runtime environment. FIG. 3b is a diagrammatic representation of the exception handling subroutine of FIG. 3a in accordance with an embodiment of the present invention. A throw_and_delete subroutine 280 takes as an argument a CORBA_exception "exc" 282, which, in one embodiment, may be the exception copied using copy statement 258 of FIG. 3a.

Throw_and_delete subroutine 280 includes a try_catch phrase 284. Within a try block 286 of try_catch phrase 284, copied exception exc 282 is thrown as appropriate, and a runtime copy of the exception is made. Specifically, if copied exception exc 282 is a system exception, which is generally of a fixed length, copied exception 282 is thrown as a system exception using a throw command. The throw command throws an object, i.e., an exception object, and essentially copies the object to an exception heap. Alternatively, if copied exception exc 282 is a user-defined exception, which is generally not of a fixed length, then copied exception exc 282 is raised as a user-defined exception. A raise subroutine, which is generated by an IDL compiler, may essentially be used to throw a user-defined exception. In the described embodiment, a user-defined exception typically may not be thrown or raised using the same command that is used to throw or raise a system exception. If a user-defined exception is thrown using the same throw command that is used to throw a system exception, for example, the user-defined exception may be "sliced" during the call to the throw command. In other words, not all of the user-defined exception may be passed into the call, meaning that information intended for the client that is to eventually receive the exception may be lost.

A catch statement 290 is arranged to catch substantially any exception. Within try_catch phrase 284, catch statement 290 is arranged to catch the exception thrown in try block 286. Within a catch block 288, copied exception exc 282 is deleted, and the exception that is caught by catch statement 290 is thrown. A throw command, which in one embodiment is called without arguments, is arranged to throw the exception that is caught by catch statement 290, and does not involve making a copy of the exception. As such, once copied exception exc 282 is deleted and the exception that is caught by catch statement 290 is thrown, storage associated with copied exceptions is effectively reclaimed.

Specifically, during the execution of throw__and__delete subroutine 280, a particular exception is thrown twice. That is, a copy of the exception that is passed into throw__and__delete subroutine 280 is thrown, and the "copy" of the exception that is that is caught by catch statement 290 is also thrown. The steps associated with executing throw__and__delete subroutine 280 to process an exception will be described in more detail below with reference to FIG. 5.

Figure 4A:
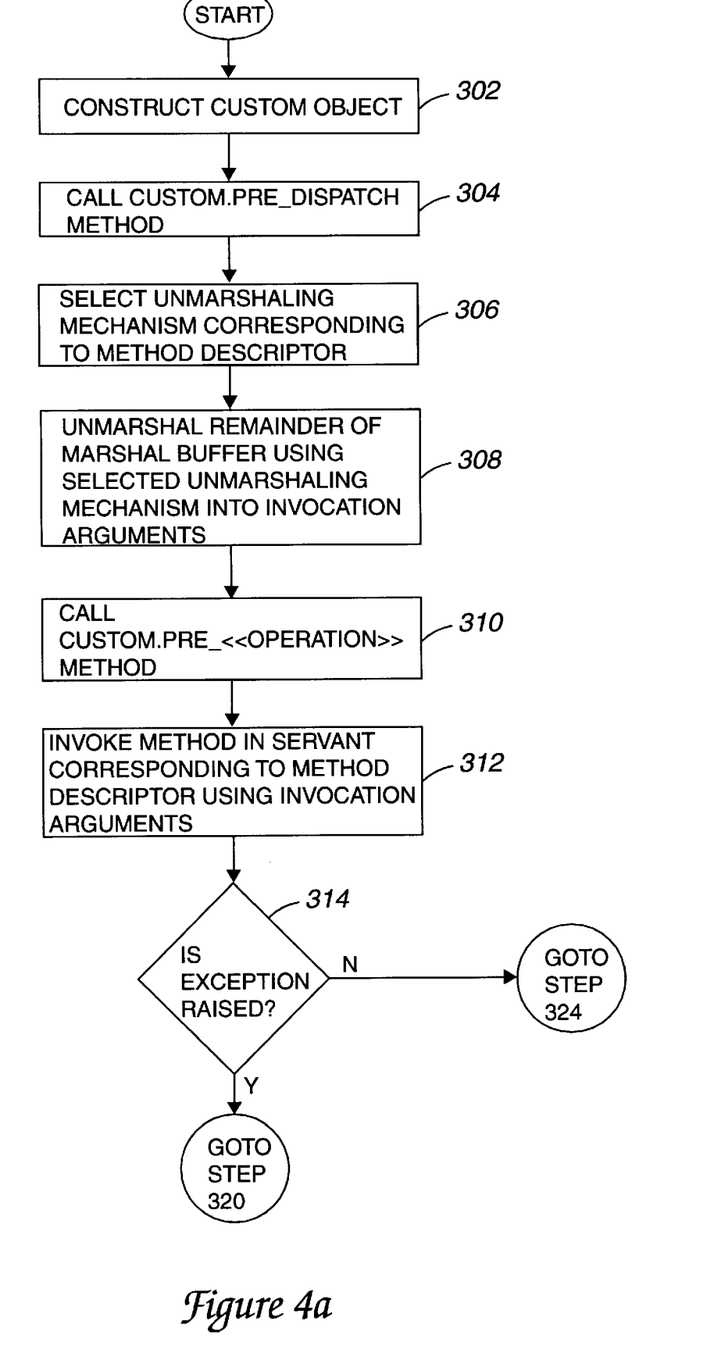
FIGS. 4a and 4b are a process flow diagram which illustrates the steps associated with the execution of a skeleton dispatch in accordance with an embodiment of the present invention.
Figure 4B:
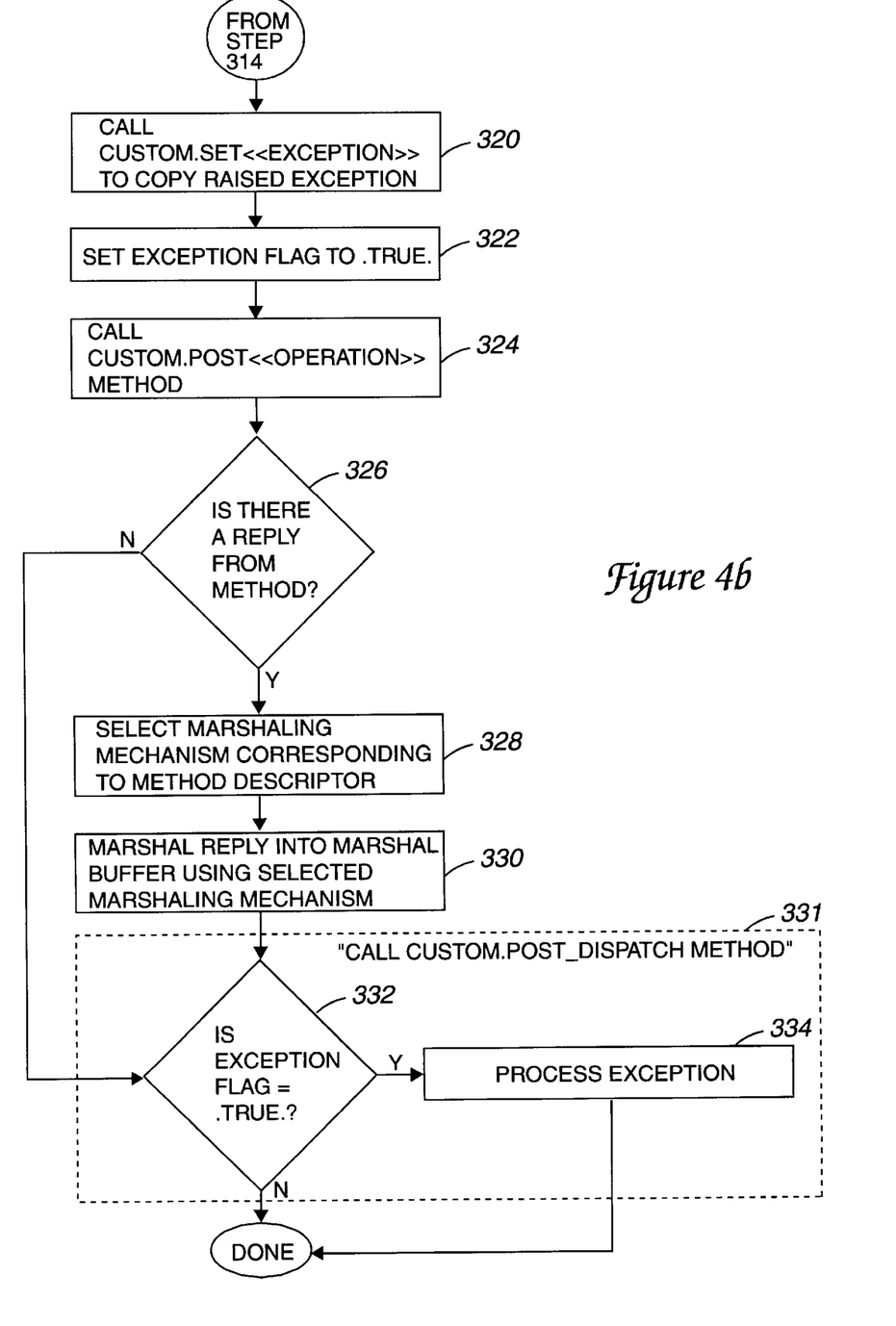

FIGS. 4a and 4b represent a process flow diagram which illustrates the steps associated with the execution of a skeleton dispatch in accordance with an embodiment of the present invention. In the described embodiment, the execution of a skeleton dispatch function enables externally provided modules of code to be executed in the context of the skeleton dispatch function. The invocation of a skeleton dispatch function begins at step 302 where custom objects are constructed. In other words, any custom objects, or modules of application code provided by a developer, are constructed. It should be appreciated that if custom objects are not present, then no custom objects are constructed. In step 304, a call is made to a custom pre-dispatch (CUSTOM.PRE__DISPATCH) method. The custom pre-dispatch method is generally a method provided by an application developer, and typically uses a user key, which is passed as an argument in a call to the skeleton dispatch function, to determine the appropriate servant to use to invoke a particular method. A user key, as described above with reference to FIG. 2c, is typically included in an object reference. In one embodiment, the particular method to invoked is generally identified in a method descriptor. A method descriptor, which may be extracted from a marshal buffer, is a data structure which holds the method name, as understood by the client, that is defined upon the servant that the client wishes to invoke. A suitable method descriptor is described in above-referenced U.S. patent application Ser. No. 08/670,700, filed Jun. 26, 1996.

The provision of allowing for the inclusion of a custom pre-dispatch method is possible through the use of a "custom hook," or customization point. A custom hook enables external code to be inserted into and executed as part of the call to the skeleton invoke method. It should be appreciated that this custom hook, like others, is provided to enable external code to be efficiently executed as a part of the call to a skeleton dispatch method.

After the call to the custom pre-dispatch method, process flow moves from step 304 to step 306 where an unmarshaling mechanism, which may correspond to the method descriptor with which the call to the skeleton dispatch function is made, is selected. In some embodiments, the unmarshaling mechanism may be a sequence of code that is selected by a switch statement. By the time a skeleton dispatch function is called, substantially all other information that was contained in the marshal buffer has previously been extracted from the marshal buffer. Hence, the only information remaining in the marshal buffer at this point are the arguments used by the method to be called.

In step 308, the selected unmarshaling mechanism is used to unmarshal the remainder of the marshal buffer into invocation arguments. After invocation arguments are obtained, in step 310, a call is made to a custom pre-operation (CUSTOM.PRE__<<OPERATION>>) method. The name of the "operation" is dependent upon the name of the IDL method that is called. In some embodiments, the operation may be the acquisition of either a read lock or a write lock. A read lock may be used to prevent write operations from occurring on a global variable at any given time, whereas a write lock may be used to prevent any read operations and more than one write operation from occurring on a global variable at any given time. The call to the custom pre-operation method is associated with a custom hook. That is, if external custom pre-operation code is provided by a user, the custom hook is considered to be active, and the external custom pre-operation code is executed.

After the call to the custom pre-operation method, in step 312, the method descriptor is used to invoke the method defined upon the servant using the invocation arguments. Invoking the method in the servant using invocation arguments typically has the effect of executing the method that was originally requested by the client. It is possible that the invoked method may return no value and may instead perform other functions, or it may be that the method returns a value to the client. In some embodiments when a custom pre-operation method is used, the invoked method may not perform any functions, as the invocation of the method may be a part of the custom pre-operation method.

After the method in the servant is invoked, process flow moves to step 314 where a determination is made regarding whether an exception was raised during the invocation of the method in the servant. If the determination is that an exception was raised, then in step 320, a call is made to a custom set-exception (CUSTOM.SET<<EXCEPTION>>) method. As will be appreciated by those skilled in the art, the name of the "exception" is dependent upon the particular type of exception that was raised. In the described embodiment, the custom set-exception method is used to create a copy of the raised exception.

An exception flag is set to indicate that an exception has been raised in step 322, after the copy of the raised exception is made. In other words, the exception flag, which is typically initialized to "false" during the construction of the custom object is set to "true." Once the exception flag is set to true, a call is made in step 324 to a custom post-operation (CUSTOM.POST__<OPERATION>>) method. The name of the "operation" is dependent upon the name of the IDL method called. The custom post-operation method is paired with the custom pre-operation method. In other words, if a custom pre-operation method is in existence, the custom post-operation method typically must also be in existence. As was the case for the custom pre-operation method, the inclusion of a custom post-operation method is also made possible by the use of a custom hook. In embodiments where the custom pre-operation method involves the acquisition of either a read lock or a write lock, the corresponding custom post-operation method typically involves the release of the read lock or the write lock, respectively.

After the custom post-operation method is called in step 324, a determination is made in step 326 regarding whether the invoked method produces a reply. If a reply is produced, control moves to step 328 where an appropriate marshaling mechanism which corresponds to the method descriptor is selected. Once the marshaling mechanism is selected, the selected marshaling mechanism is used to marshal the reply into a marshal buffer in step 330. In the event that the reply contains more bytes than the marshal buffer which contained the object reference is capable of encapsulating, a new marshal buffer may be created to encapsulate the reply. Otherwise, the reply is typically marshaled into the marshal buffer which contained the request.

After the reply is marshaled into the marshal buffer, a call is made to a custom post-dispatch (CUSTOM.POST__

DISPATCH) method in step 331. A custom post-dispatch method, which is paired with a custom pre-dispatch method, may be used for purposes which include, but are not limited to, reference counting. That is, the custom post-dispatch method is typically used to keep track of threads, which are used to execute methods, in the sense of counting the number of threads which are executing methods at the time the custom post-dispatch method is called. In the described embodiment, the custom post-dispatch method includes processing an exception. One suitable method for processing an exception will be described below with respect to FIG. 5. Again, a custom hook is used to make it possible to include application code pertaining to the custom post-dispatch method. Once the call is made to the custom post-dispatch method, the reply is ready to be returned through the transport layer to the client.

A call to the custom post-dispatch method in step 331 includes, in the described embodiment, sub-steps 332 and 334. Step 332 is a determination regarding whether the exception flag is set to false. The exception flag, as previously described, was set to indicate whether an exception was raised during the invocation of a method in a servant. If the determination is that the exception flag is false, then the indication is that no exception was raised. Hence, no exception is to be processed, and the steps associated with executing a skeleton dispatch function are completed.

Alternatively, if the determination in step 332 is that the exception flag is set to true, then the indication is that an exception was raised. Accordingly, process flow then moves from step 332 to step 334 in which preparations are made to process the exception. The steps associated with processing the exception will be described below with reference to FIG. 5. After the exception is processed, the execution of a skeleton dispatch function is effectively completed.

Returning to step 326, if the determination is that no reply is produced from the method, then process control proceeds to step 331 where a call is made to a custom post-dispatch method. After the call to the custom post-dispatch method, the steps associated with a skeleton dispatch are completed, and a reply is essentially ready to be returned, via a transport layer, to the requesting client.

Figure 5:
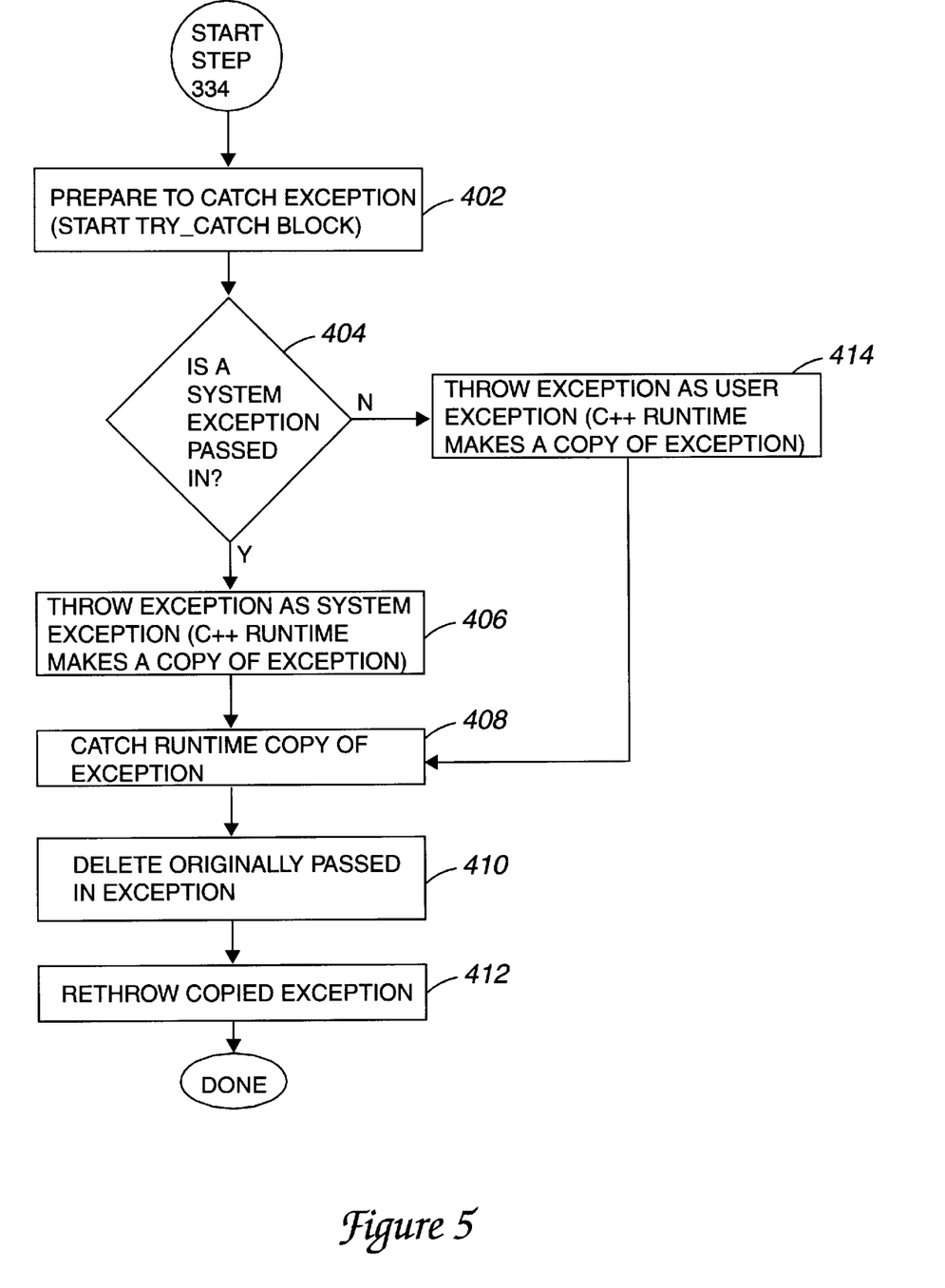
FIG. 5 is a process flow diagram which illustrates the steps associated with processing an exception, i.e., step 334 of FIG. 4b in accordance with an embodiment of the present invention.

Referring next to FIG. 5, the steps associated with the processing of an exception, i.e., step 334 of FIG. 4b, will be described in accordance with an embodiment of the present invention. The process begins at step 402 in which preparations are made to catch the exception. In the described embodiment, preparing to catch an exception may include starting a try_catch block. An example of a try_catch block was described above with respect to the throw_and_delete subroutine of FIG. 3b. After preparations are made to catch the exception, a determination is made in step 404 regarding whether a system exception was passed into the try_catch block.

If it is determined that a system exception was passed in, then process flow moves to step 406 where the exception is thrown as a system exception. As will be appreciated by those skilled in the art, in a C++ environment, a copy of the exception is made at runtime. Once the exception is thrown as a system exception, the copy of the exception is "caught" in step 408. In the described embodiment, the copy of the exception is caught in the "catch" portion of a try_catch block. After the copy of the exception is caught, the exception which was originally passed in is deleted in step 410 in order to reclaim the memory occupied by the exception that was originally passed in. Then, in step 412, the copied exception is thrown. That is, the exception that was caught in the catch portion of a try_catch block is thrown, and the process of calling a custom post-dispatch method is completed.

Returning to step 404, if the determination is that a system exception was not passed in, then, in the described embodiment, the implication is that a user exception was passed in. A user exception is an exception that is defined by a user and, unlike a system exception, may be of any length. Accordingly, the exception throwing mechanisms that are used for throwing user exceptions are generally different from those used to throw system exceptions. When it is determined that a user exception was passed in, then process flow moves from step 404 to step 414 in which the exception is thrown as a user exception. As was the case for a system exception, a copy of the exception, ie., the user exception, is made at runtime. After the exception is thrown as a user exception, process flow proceeds to step 408 where the runtime copy of the exception is caught.

Figure 6:
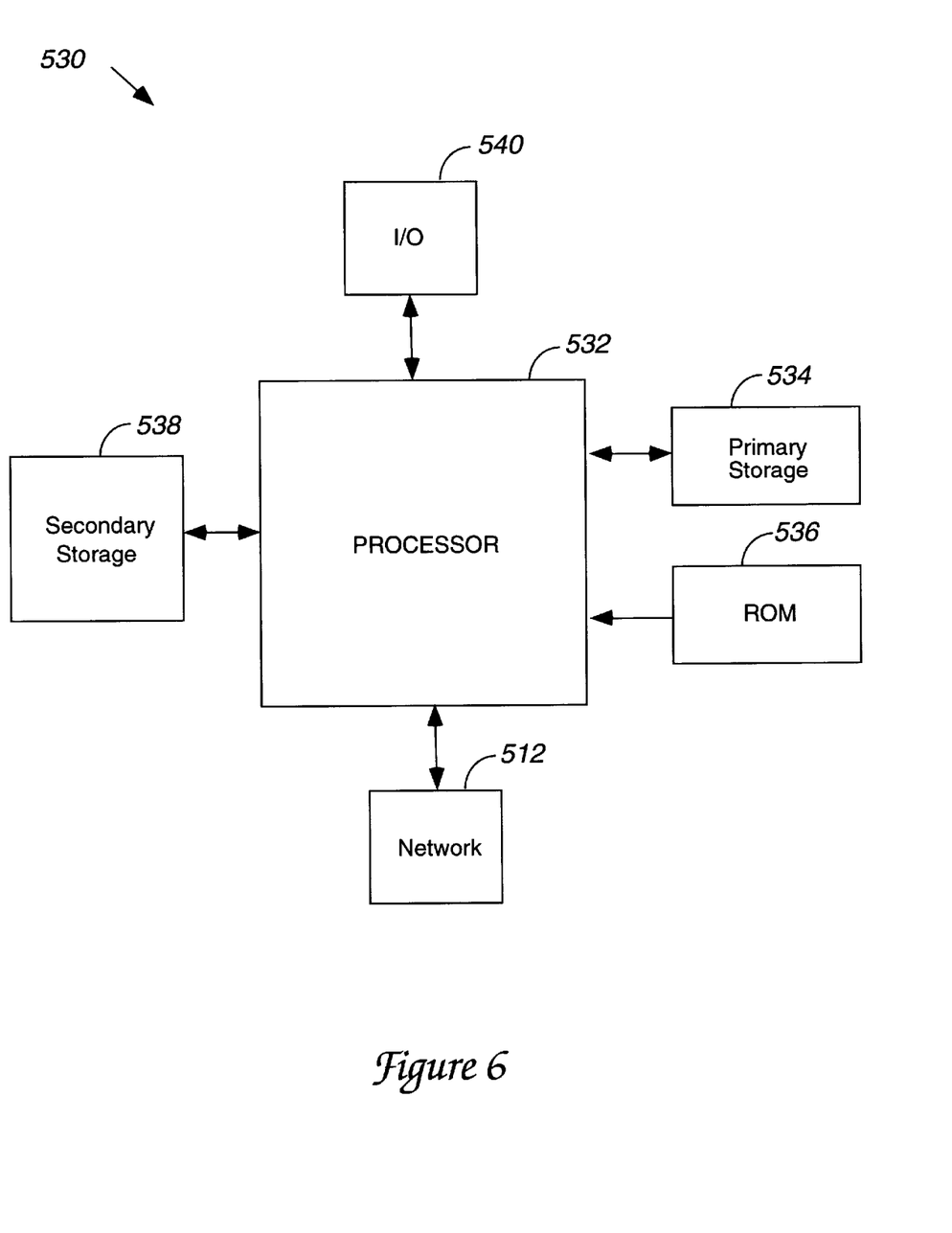
FIG. 6 is a diagrammatic representation of a computer system suitable for implementing the present invention.

The present invention may generally be implemented on any suitable computer system. FIG. 6 illustrates a typical, general-purpose computer system suitable for implementing the present invention. The computer system 530 includes a processor 532 (also referred to as a central processing units, or CPU) that is coupled to memory devices including primary storage devices 536 (typically a read only memory, or ROM) and primary storage devices 534 (typically a random access memory, or RAM).

As is well known in the art, ROM acts to transfer data and instructions unidirectionally to CPU 532, while RAM is used typically to transfer data and instructions in a bi-directional manner. Both storage devices 534, 536 may include any suitable computer-readable media. A secondary storage medium 538, which is typically a mass memory device, is also coupled bi-directionally to CPU 532 and provides additional data storage capacity. The mass memory device 538 is a computer-readable medium that may be used to store programs including computer code, data, and the like. Typically, mass memory device 538 is a storage medium such as a hard disk or a tape which generally slower than primary storage devices 534, 536. Mass memory storage device 538 may take the form of a magnetic or paper tape reader or some other well-known device. It will be appreciated that the information retained within the mass memory device 538, may, in appropriate cases, be incorporated in standard fashion as part of RAM 536 as virtual memory. A specific primary storage device 534 such as a CD-ROM may also pass data uni-directionally to CPU 532.

CPU 532 is also coupled to one or more input/output devices 540 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 532 optionally may be coupled to a computer or telecommunications network, e.g., an internet network, or an intranet network, using a network connection as shown generally at 512. With such a network connection, it is contemplated that CPU 532 might receive information from the network, or might output information to the network in the course of performing the above-described method steps. Such information, which is often represented as a sequence of instructions to be executed using CPU 532, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on CPU 532 and other CPUs, as for example a CPU which is in communication with CPU 532 across network connection 512. Specifically, the above-described method steps may be performed across a computer network.

Although only a few embodiments of the present invention have been described, it should be understood that the present invention may be embodied in many other specific forms without departing from the spirit or the scope of the present invention. By way of example, the steps associated with executing a skeleton dispatch function in accordance with the present invention may be re-ordered. Steps may generally be altered, added, and removed without departing from the spirit or scope of the present invention. For instance, the check to determine whether an exception flag is set to false may be eliminated if code associated with processing an exception is duplicated. However, eliminating the step of checking an exception flag may not always increase the overall efficiency of executing a skeleton dispatch function, as the duplication of code, in some embodiments, may cause significant code bloat.

While the methods of the present invention have been described in terms of deferring the throwing of exceptions in a C++ environment, it should be appreciated that the methods may generally be applicable to any suitable environment. For example, the present invention may be implemented in any environment in which exceptions must be temporarily stored such that the throwing of exceptions may be delayed. Therefore the described embodiments should be taken as illustrative and not restrictive, and the invention should be defined by the following claims and their full scope of equivalents.

What is claimed is:

1. A method for processing a request dispatched to a skeleton in a skeleton layer on a server of a distributed client/server based computing system, the method comprising:

constructing a custom object associated with the request, the custom object being a module of application code which is inserted into the distributed client/server based computing system;

calling a custom pre-dispatch method which corresponds to the custom object, the custom pre-dispatch method being used to determine an appropriate servant to use to invoke a called method specified in the request;

invoking the called method in the servant which corresponds with the request using invocation arguments in a marshal buffer; and calling a custom post-dispatch method which corresponds to the custom object, the custom post-dispatch method being used to process an exception when the exception is raised during invocation of the called method, wherein calling the custom post-dispatch method includes processing a first copy of the exception that is arranged to be stored off of an execution heap and processing a second copy of the exception that is arranged to be stored on the execution heap when the exception is raised during invocation of the called method.

2. A method as recited in claim 1 wherein the method further includes creating the first copy of the exception and storing the first copy of the exception when an exception is raised during invocation of the called method.

3. A method as recited in claim 2 wherein calling the custom post-dispatch method includes:

throwing the first copy of the exception by creating the second copy of the exception, the second copy of the exception being a runtime copy of the exception, wherein the runtime copy of the exception is stored on the execution heap;

catching the runtime copy of the exception;

deleting the first copy of the exception; and rethrowing the caught runtime copy of the exception.

4. A method as recited in claim 3 further including:

starting a try_catch block arranged to catch the first copy of the exception.

5. A method as recited in claim 3 further including:

determining whether the exception is a system exception.

6. A method as recited in claim 5 throwing the first copy of the exception includes:

throwing the first copy of the exception as the system exception when the exception is the system exception; and throwing the first copy of the exception as a user exception when it is determined that the exception is not the system exception.

7. A method as recited in claim 1 wherein the exception is a C++ exception.

8. A method as recited in claim 1 further including:

selecting an unmarshaling mechanism which corresponds to the request; and unmarshaling at least a part of a marshal buffer into invocation arguments using the selected unmarshaling mechanism.

9. A distributed object-based computing system arranged to process a request dispatched to a skeleton in a skeleton layer on a server of the computing system, the method comprising:

an execution heap;

a processor;

a custom object associated with the request, the custom object being a module of application code which is inserted into the computing system;

a mechanism for calling a custom pre-dispatch method which corresponds to the custom object, the custom pre-dispatch method being used to determine an appropriate servant to use to invoke a called method specified in the request;

a selector for selecting an unmarshaling mechanism which corresponds to the request, wherein the unmarshaling mechanism is arranged to unmarshal at least a part of a marshal buffer into invocation arguments;

a method invoker for invoking the called method in the servant which corresponds with the request using the invocation arguments;

a mechanism for determining when an exception is raised during invocation of the called method; and a caller for calling a custom post-dispatch method which corresponds to the custom object, the custom post-dispatch method being arranged to process the exception when it is determined that the exception was raised during invocation of the called method, wherein the caller for calling the custom post-dispatch method processes a first copy of the exception that is arranged to be stored off of the execution heap and a runtime copy of the exception that is arranged to be stored on the execution heap when the exception is raised during invocation of the called method.

10. A computing system according to claim 9 further including a copying mechanism for creating the first copy of the exception when it is determined that the exception is raised during invocation of the called method.

11. A computing system according to claim 10 further including:
   a first throwing mechanism arranged to throw the first copy of the exception, the throwing mechanism further being arranged to create the runtime copy of the exception, wherein the
   execution heap is arranged to store the runtime copy of the exception.

12. A computing system according to claim 11 further including:
   a catching mechanism arranged to catch the runtime copy of the exception;
   a deleting mechanism arranged to delete the first copy of the exception; and
   a second throwing mechanism arranged to throw the caught runtime copy of the exception.

13. A computer program product for processing a request dispatched to a skeleton in a skeleton layer on a server of a distributed client/server based computing system comprising:
   computer code that constructs a custom object associated with the request, the custom object inserted into the distributed client/server based computing system;
   computer code that calls a custom pre-dispatch method which corresponds to the custom object, the custom pre-dispatch method being used to determine an appropriate servant to use to invoke a called method specified in the request;
   computer code that selects an unmarshaling mechanism which corresponds to the request;
   computer code that unmarshals at least a portion of a marshal buffer into invocation arguments using the selected unmarshaling mechanism;
   computer code that invokes the called method in the servant which corresponds with the request using the invocation arguments;
   computer code that determines when an exception is raised during invocation of the called method;
   computer code that calls a custom post-dispatch method which corresponds to the custom object, the custom post-dispatch method being used to process the exception when it is determined that the exception was raised during invocation of the called method, wherein the computer code that calls the custom post-dispatch method includes computer code that processes a first copy of the exception that is arranged to be stored off of an execution heap and a second copy of the exception that is arranged to be stored on the execution heap when the exception is raised during invocation of the called method; and
   a computer readable medium that stores the computer codes.

14. A computer program product according to claim 13 wherein the computer readable medium is a data signal embodied in a carrier wave.

* * * * *